3,350,457
PRODUCTION OF PERHALOCYCLOHEXANONES
Alson K. Price, Mine Hill, and Richard F. Sweeney, Dover, N.J., assignors to Allied Chemical Corporation, New York, N.Y., a corporation of New York
No Drawing. Filed May 13, 1965, Ser. No. 455,580
6 Claims. (Cl. 260—586)

This invention relates to a novel process for producing perhalocyclohexanones, and more particularly perfluorocyclohexanone and 2-chlorononafluorocyclohexanone.

Procedures for preparing fluorinated ketones are known to those skilled in the art. Fluorination, and especially perfluorination of ketones, has posed serious problems due to the well known tendency of these materials to dissociate and form a variety of decomposition products under fluorinating conditions. For example, acetone when fluorinated with a strong fluorinating agent, such as elemental fluorine, produces some $CF_3COCF_3$, but a predominant amount of $CH_2FCOCH_3$, $CF_4$, $COF_2$, $CF_3COF$ and $(COF)_2$ by-products. Fluorination of perhalogenated ketones, including perchlorofluoroketones, to form the corresponding perfluorinated ketones is possible with HF at elevated temperatures and with the aid of catalysts. This procedure, however, entails all the difficulties involved when handling HF at high temperatures.

Accordingly, an object of the present invention is to provide a simple and economical process for the preparation of perhalocyclohexanones which does not possess the disadvantages previously incurred by the art.

More specifically, it is an object of the invention to provide a simple and economical process for the preparation of perfluorocyclohexanone and 2-chlorononafluorocyclohexanone, a novel compound.

Other objects and advantages of the invention will become apparent from the following description.

According to the present invention, perhalocyclohexanones are produced by fluorinating 1,2-dichlorooctafluorocyclohexene epoxide with certain inorganic metal fluorides, including KF, CsF, LiF and AgF.

1,2-dichlorooctafluorocyclohexene epoxide, the starting material, can be prepared by the epoxidation of 1,2-dichlorooctafluorocyclohexene. Typically, the 1,2-dichlorooctafluorocyclohexene is added to a stirred mixture of methanolic potassium hydroxide and aqueous hydrogen peroxide maintained at a temperature of about —40° to 65° C. At the end of the reaction, the mixture is diluted with water to form aqueous and organic layers. The lower organic layer, which contains 1,2-dichlorooctafluorocyclohexene epoxide and unreacted 1,2-dichlorooctafluorocyclohexene is separated and dried. Final separation of epoxides may be readily effected by fractional distillation or by use of vapor phase chromatography.

The inorganic metal fluoride employed in fluorination of the 1,2-dichlorooctafluorocyclohexene epoxide, preferably KF, is desirably used in anhydrous form. The presence of water, even in small amounts, reduces the yield of perhalocyclohexanones obtained. Accordingly, even though KF, for example, is commercially available in anhydrous form and may be used as such, it is desirable to dry the KF further just prior to use, such as by heating the KF in a vacuum oven at a temperature of about 100° to 150° C. for a period of about 2 to 16 hours.

The ratio of inorganic metal fluoride to 1,2-dichlorooctafluorocyclohexene epoxide is the stoichiometric amount, or somewhat above or below that amount, required to effect replacement of both of the chlorine atoms or one chlorine atom (depending on the particular product desired) present in the starting material. An excess of 10% or more of the stoichiometric amount is preferably used in order to insure complete reaction. In any event, the reaction mixture contains varying amounts of perfluorocyclohexanone and 2-chlorononafluorocyclohexanone. Inorganic metal chloride is evolved as a by-product and may be collected and measured to provide a convenient check on the progress of the reaction.

A solvent, if used, may be any organic polar solvent which does not react with the starting material or products. This type of organic solvent is hereinafter referred to as inert polar solvent, the term inert referring to the non-reactivity of the solvent with the starting material and products according to the process of the invention. Solvents falling within this definition are well known in the art and include such water-soluble substances as sulfones, dialkyl sulfides, polyalkylene glycol ethers, alkylene carbonates, N-alkylpyrrolidones and lactones. Illustrative solvents which may be employed include tetramethylene sulfone (tetrahydrothiophene-1,1-dioxide), dimethylformamide, ethylene carbonate, N-methylpyrrolidone, diethylformamide, diethyleneglycol dimethylether and alpha-butyrolactone. In order to avoid introducing water into the system, the selected solvent should preferably be employed in anhydrous form. The solvent may be dried prior to use by any conventional method, such as distillation.

The reaction temperature is not critical, although elevated temperatures should be employed in order to insure favorable fluorination rates. The temperature is, at least in part, determined by the boiling point of the inert polar solvent, if used. The reaction is run in liquid phase as is evident from the examples. Generally, the temperature ranges from about 30° to 200° C., with the preferred temperature being from about 130° to 170° C. The process may be carried out under atmospheric, subatmospheric and superatmospheric pressure. Atmospheric pressure is most practical, however, and is preferred.

During the reaction, a stream of an inert gas, such as nitrogen, is passed through the reactor. This aids in maintaining anhydrous conditions and removing the products from the reactor. It has been found that the ratio of 2-chlorononafluorocyclohexanone to perfluorocyclohexanone in the reaction mixture may be increased by passing the inert gas through the reactor at faster rates.

Product recovery is simple and involves only condensation of the exit gases and subsequent fractional distillation to give perfluorocyclohexanone or 2-chlorononafluorocyclohexanone, as desired.

The preferred method of carrying out the invention involves slowly adding 1,2-dichlorooctafluorocyclohexene epoxide to a stirred, heated suspension of anhydrous potassium fluoride in a suitable inert polar solvent. The organic vapors leaving the reactor are condensed, and the desired product is then separated by fractional distillation.

Although fluorination reactions involving the use of inorganic metal fluorides are known to the art, it was completely unpredictable that the treatment of an epoxide with an inorganic metal fluoride would not only result in replacement of chlorine atoms with fluorine but that the epoxide would rearrange to give ketones.

The following examples illustrate practice of the invention. Parts and percentages are by weight, unless otherwise stated.

*Example I.—Production of 1,2-dichlorooctafluorocyclohexene epoxide*

A nitrogen-purged reactor equipped with a stirrer and reflux condenser was charged with about 355 parts of methanol. The system was kept under a nitrogen atmosphere, and vigorous stirring was maintained throughout the course of the reaction. 57 parts of potassium hydroxide was added to the stirred methanol, while maintaining the temperature of the reactor contents at about 25° C. with a water bath. When all the potassium hydroxide had dissolved, the temperature was lowered to 0° C. with an ice bath, and 151.5 parts of 30% hydrogen peroxide was introduced into the reactor. 90 parts of 1,2-dichlorooctafluorocyclohexene was then added dropwise over a 75 minute period. The reaction was allowed to continue for an additional 80 minutes. The reactor contents were then diluted with about 400 parts of water, and stirring was discontinued. Aqueous and organic layers formed. The lower organic layer, comprising 42.4 parts, was separated and dried over sodium sulfate. Infrared analysis showed that this layer was composed of unreacted 1,2-dichlorooctafluorocyclohexene and the corresponding 1,2-dichlorooctafluorocyclohexene epoxide in ratio of 11:89.

The olefin and epoxide mixture was subjected to further treatment with basic hydrogen peroxide, as described above, to obtain substantially pure epoxide. The infrared spectrum of the pure epoxide exhibited a band of medium intensity at 7.25 microns and strong bands at 7.58, 8.0, 8.3, 8.7, 9.5, 10.2, 11.28 and 11.62 microns. The epoxide had the following elemental analysis:

Found: C, 23.1%; H, 0%; Cl, 22.7%; F, 49.0%. Calculated C, 23.2%; H, 0%; Cl, 22.8%; F, 48.9%.

*Example II.—Production of perfluorocyclohexanone and 2-chlorononafluorocyclohexanone*

100 parts of 1,2-dichlorooctafluorocyclohexene epoxide was added dropwise to a stirred slurry of 35 parts of anhydrous potassium fluoride in 175 parts of tetramethylene sulfone in a nitrogen-purged reactor equipped with a stirrer. A slow stream of nitrogen was continuously passed through the reactor. The temperature was maintained at about 160° C. during the epoxide addition and was then raised slowly to 200° C. after addition was completed. Organic vapors exiting the reactor were condensed and collected. Fractional distillation of the condensate gave 22.8 parts of perfluorocyclohexanone boiling at 50° to 55° C. The material was identified by comparison of its boiling point, infrared spectrum and gas chromatogram with those of a known sample of perfluorocyclohexanone. The infrared spectrum of the perfluorocyclohexanone showed a ketone absorption band at 5.55 microns. Other strong absorption bands appeared at 7.65, 7.96, 8.43, 10.05 and 10.35 microns.

In a later fraction, 4 parts of 2-chlorononafluorocyclohexanone having a boiling point of 83° to 86° C. was obtained. The infrared spectrum of the 2-chlorononafluorocyclohexanone showed a ketone absorption band at 5.52 microns. Other strong absorption bands appeared at 7.59, 7.85-8.8, 9.99, 10.25, 11.39 and 11.6 microns. Elemental analysis of this product gave the following results:

Found: C, 24.7%; Cl, 11.6%; F, 59.0%. Calculated C, 24.4%; Cl, 11.9%; F, 58.0%.

The process of Example II may be repeated using CsF, LiF or AgF in place of KF to obtain the desired perfluorocyclohexanone and 2-chlorononafluorocyclohexanone.

Perfluorocyclohexanone reacts readily with water to give the corresponding perfluorocyclohexanone hydrate, disclosed and claimed in copending application Ser. No. 427,484 of Louis G. Arnello and Richard F. Sweeney, filed Jan. 22, 1965. The hydrate has been found to be an excellent solvent for Capran (Nylon-6).

2-chlorononafluorocyclohexanone may be employed as a sealing adjuvant for films of trifluorochloroethylene polymers. For example, a saturated solution of a film composed of a copolymer of about 96% trifluorochloroethylene and about 4% vinylidene fluoride was prepared by placing 10% by weight of the film in 2-chlorononafluorocyclohexanone, heating to reflux and decanting the solution from undissolved film. The solution was coated on a strip of the film, and the treated film was sealed using an impulse heat sealed at temperature of 375° F. and 30 p.s.i.g. pressure for 3 seconds. The sealed film was then tested to determine how much hanging weight was required to effect rupture of 1 sq. in. area of the film. A 677 gram weight was required in the case of the treated film, as compared to a 9 gram weight for untreated film.

While the above described the preferred embodiments of our invention, it will be understood that departures can be made therefrom within the scope of the specification and the appended claims.

We claim:

1. A process for preparing a perhalocyclohexanone which comprises reacting 1,2-dichlorooctafluorocyclohexene epoxide with an inorganic metal fluoride selected from a group consisting of KF, CsF, LiF and AgF in liquid phase and recovering the perhalocyclohexanone from the reaction mixture.

2. The process of claim 1 wherein perfluorocyclohexanone or 2-chlorononafluorocyclohexanone is recovered from the reaction mixture by distillation.

3. The process of claim 1 wherein the inorganic metal fluoride is KF.

4. The process of claim 1 wherein the reaction is carried out in the presence of an inert polar solvent.

5. The process of claim 1 wherein the reaction is carried out at a temperature of from about 30° to 200° C.

6. The process of claim 1 wherein the reaction is carried out at a temperature of from about 130° to 170° C.

References Cited

UNITED STATES PATENTS 2,712,554  7/1955  Miller _____ 260—586 X
3,147,211  9/1964  Robinson _____ 260—586 X

OTHER REFERENCES

Mills, "J. Am. Chem. Soc.," vol. 81, p. 5515 (1959).

LEON ZITVER, *Primary Examiner.*

M. JACOB, *Assistant Examiner.*